US011288322B2

(12) United States Patent
Feng et al.

(10) Patent No.: US 11,288,322 B2
(45) Date of Patent: Mar. 29, 2022

(54) CONVERSATIONAL AGENTS OVER DOMAIN STRUCTURED KNOWLEDGE

(71) Applicant: International Business Machines Corporation, Armonk, NY (US)

(72) Inventors: Song Feng, New York, NY (US); Chulaka Gunasekara, New Hyde Park, NY (US); Kshitij Fadnis, Astoria, NY (US); Lazaros Polymenakos, Lexington, MA (US); Sunil Davangere Shashidhara, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 16/733,267

(22) Filed: Jan. 3, 2020

(65) Prior Publication Data
US 2021/0209167 A1 Jul. 8, 2021

(51) Int. Cl.
*G06F 17/00* (2019.01)
*G06F 16/9032* (2019.01)
*G06F 40/295* (2020.01)
*G06F 40/30* (2020.01)

(52) U.S. Cl.
CPC ...... *G06F 16/90332* (2019.01); *G06F 40/295* (2020.01); *G06F 40/30* (2020.01)

(58) Field of Classification Search
None
See application file for complete search history.

(56) References Cited

U.S. PATENT DOCUMENTS

| 8,560,325 | B2 | 10/2013 | Kanevsky et al. |
| 8,903,716 | B2 | 12/2014 | Chen et al. |
| 8,924,410 | B2 | 12/2014 | Bierner |
| 10,068,567 | B1 | 9/2018 | Hermush et al. |
| 2007/0162442 | A1 | 7/2007 | Brill et al. |
| 2012/0166178 | A1 | 6/2012 | Latzina |
| 2014/0279993 | A1 | 9/2014 | Bernhardt et al. |
| 2018/0052842 | A1* | 2/2018 | Hewavitharana ... G06F 16/3329 |
| 2018/0068031 | A1* | 3/2018 | Hewavitharana ........................... G06F 16/90328 |

(Continued)

OTHER PUBLICATIONS

PCT International Search Report and Written Opinion, PCT/IB2020/061579, dated Mar. 15, 2021.

*Primary Examiner* — Satwant K Singh
(74) *Attorney, Agent, or Firm* — Lieberman & Brandsdorfer, LLC

(57) ABSTRACT

Embodiments relate to a system, program product, and method directed at natural language (NL) and a virtual dialog platform. An NL statement is detected and analyzed to identify one or more entities expressed in the statement. The identified entities are leveraged to parse the statement into keywords. The intent of the received statement is represented as a relationship between two or more of the keywords. A knowledge representation is identified to represent the statement with respect to a formatted module having two or more components and a component relationship structure. Each statement keyword is assigned to a designated module component based on an alignment of the component relationship with the keyword relationship. The statement intent is expressed based on the relationship between the keywords, and a statement response is inferred. The inferred statement is communicated to the virtual dialog platform.

20 Claims, 10 Drawing Sheets

(56) References Cited

U.S. PATENT DOCUMENTS

| | | |
|---|---|---|
| 2018/0150550 A1 | 5/2018 | Sharma |
| 2018/0173808 A1* | 6/2018 | Sharma ................ G06F 16/242 |
| 2019/0103111 A1 | 4/2019 | Tiwari |
| 2019/0130915 A1 | 5/2019 | Nitz |
| 2019/0188590 A1 | 6/2019 | Wu et al. |
| 2019/0286711 A1* | 9/2019 | Terry .................... G06F 40/295 |
| 2019/0286712 A1* | 9/2019 | Terry ...................... G06F 40/30 |
| 2019/0286713 A1* | 9/2019 | Terry ...................... H04L 51/02 |

* cited by examiner

CONVERSATIONAL AGENTS OVER DOMAIN STRUCTURED KNOWLEDGE

BACKGROUND

The present invention relates to natural language processing and a virtual communication platform. More specifically, the invention relates to an artificial intelligence virtual dialog platform, e.g. chatbot, to simulate interactive conversation. A unified framework is introduced and utilized to develop the corresponding conversational agent for goal oriented information retrieving tasks over structured knowledge.

SUMMARY

The embodiments include a system, computer program product, and method for leveraging a unified framework to analyze a natural language statement.

In one aspect, a system is provided for use with an artificial intelligence (AI) platform to represent natural language (NL) intent within a virtual dialog platform. As shown, the system is provided with a processing unit, e.g. processor, operatively coupled to memory. An AI platform is provided in communication with the processing unit. The AI platform is embedded with tools in the form of a natural language (NL) manager, a relationship manager, and a communication manager. The NL manager functions to detect a NL statement received in a virtual dialog platform, identify one or more entities expressed in the statement, and leverage the identified entities to parse the statement into one or more keywords. The relationship manager functions to represent the intent of the received statement as a relationship between two or more keywords identified in the statement. The relationship manager further identifies a knowledge representation to represent the statement as a formatted module having two or more components and a component relationship structure. Each statement keyword is assigned to a designated module component based on an alignment of the component relationship with the keyword relationship. The communication manager functions to express the statement intent, based on the relationship between two or more keywords, and to infer a response to the received statement. The inferred statement is communicated to the virtual dialog platform.

In another aspect, a computer program product is provided to represent an intent within a virtual dialog platform. The computer program product includes a computer readable storage medium having program code embodied therewith, with the program code executable by a processor to detect a natural language (NL) statement received in a virtual dialog platform. The NL statement is analyzed to identify one or more entities expressed in the statement. The identified entities are leveraged to parse the statement into one or more keywords. Program code is provided to represent the intent of the received statement as a relationship between two or more keywords identified in the statement. A knowledge representation is identified to represent the statement as a formatted module having two or more components and a component relationship structure. Each statement keyword is assigned to a designated module component based on an alignment of the component relationship with the keyword relationship. Program code is further provided to express the statement intent based on the relationship between two or more keywords and to infer a response to the received statement. The inferred statement is communicated to the virtual dialog platform.

In yet another aspect, a method is provided to represent an intent within a virtual dialog platform. A natural language (NL) statement is detected and analyzed to identify one or more entities expressed in the statement. The identified entities are leveraged to parse the statement into one or more keywords. The intent of the received statement is represented as a relationship between two or more keywords identified in the statement. A knowledge representation is identified to represent the statement as a formatted module having two or more components and a component relationship structure. Each statement keyword is assigned to a designated module component based on an alignment of the component relationship with the keyword relationship. The statement intent is expressed based on the relationship between two or more keywords and a response to the received statement is inferred. The inferred statement is communicated to the virtual dialog platform.

These and other features and advantages will become apparent from the following detailed description of the presently exemplary embodiment(s), taken in conjunction with the accompanying drawings.

BRIEF DESCRIPTION OF THE SEVERAL VIEWS OF THE DRAWINGS

The drawings referenced herein form a part of the specification and are incorporated herein by reference. Features shown in the drawings are meant as illustrative of only some embodiments, and not of all embodiments, unless otherwise explicitly indicated.

DETAILED DESCRIPTION

Figure 1:
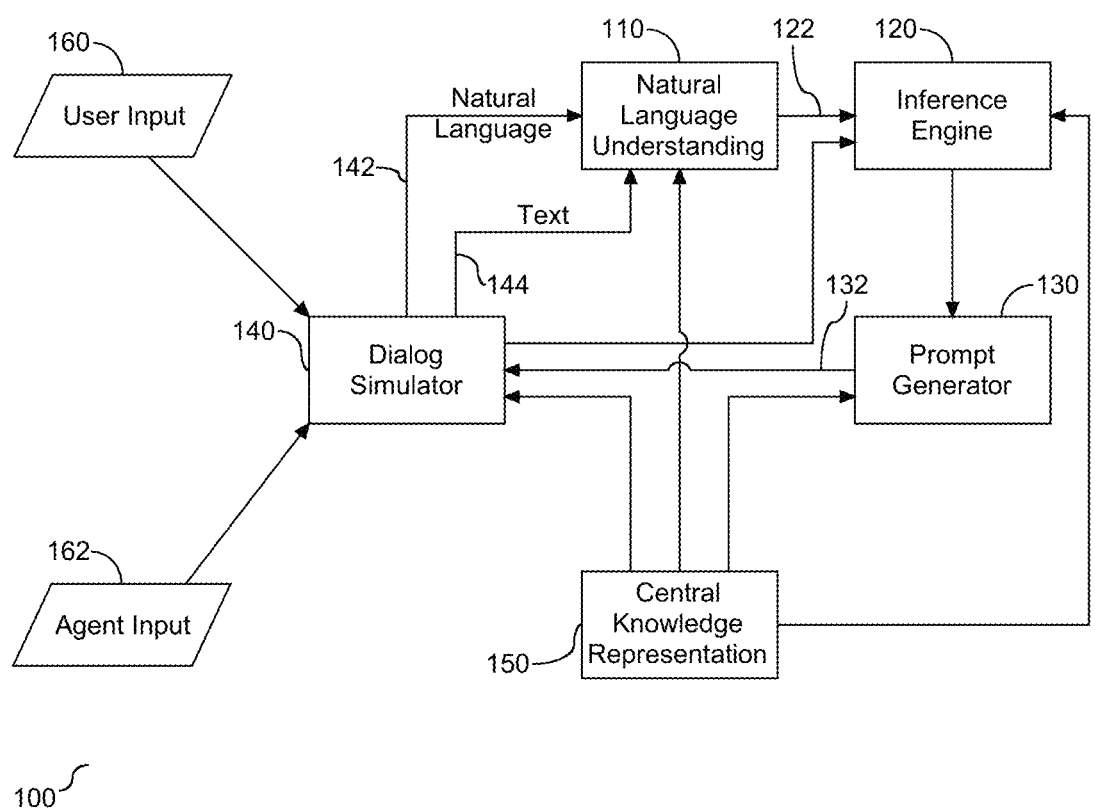
FIG. 1 depicts a block diagram to illustrate an embodiment of an architecture of a dialog framework.

It will be readily understood that the components of the present embodiments, as generally described and illustrated in the Figures herein, may be arranged and designed in a wide variety of different configurations. Thus, the following detailed description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

In the field of artificial intelligent systems, natural language processing systems (such as the IBM Watson® artificially intelligent computer system and other natural language systems) process natural language based on knowledge acquired by the system. To process natural language, the system may be trained with data derived from a database or corpus of knowledge, but the resulting outcome can be incorrect or inaccurate for a variety of reasons.

Machine learning (ML), which is a subset of Artificial intelligence (AI), utilizes algorithms to learn from data and create foresights based on this data. AI refers to the intelligence when machines, based on information, are able to make decisions, which maximizes the chance of success in a given topic. ML employs one or more neural models to identify input patterns and contains algorithms that evolve over time. Neural models emulate the way the human nervous system operates. Basic units are referred to as neurons, which are typically organized into layers. The neural model works by simulating a large number of interconnected processing units that resemble abstract versions of neurons. There are typically three parts in a neural model, including an input layer, with units representing input fields, one or more hidden layers, and an output layer, with a unit or units representing target field(s). The units are connected with varying connection strengths or weights. Input data are presented in the first layer, and values are propagated from each neuron to every neuron in the next layers. A result is delivered from the output layer. Neural models are designed to emulate how the human brain works, so computers can be trained to support minimally defined abstractions and problems.

At the core of AI and associated reasoning lies the concept of similarity. The process of understanding natural language and objects requires reasoning from a relational perspective that can be challenging. Existing solutions for efficiently identifying objects and understanding natural language and processing content response is extremely difficult at a practical level.

Virtual conversation agents, also referred to herein as chatbots, are rising in demand for making existing services or information accessible, or more accessible, to end users. This drive in demand entails making commercial virtual locations, e.g. websites and mobile applications, conversational. Previous development framework for building such conversational agents typically provided a modular pipeline of dialog subtasks, such as natural language understanding (NLU) dialog management, for example. In those frameworks, each module requires its own well designed and annotated data. However, the task of obtaining such data is complicated, labor intensive, and non-trivial to maintain. There is a need to provide tools and solutions with respect to data collection to improve the conversation agent. Accordingly, as shown and described herein, a system, computer program product, and method, are provided to demonstrate a unified framework for developing a conversational agent for goal oriented information retrieving tasks over structured knowledge.

The unified framework provides a pipeline that can be consumed by end-to-end trainable models. In particular, the framework is designed to reinforce a centralized knowledge representation to semantically ground multiple dialog subtasks. As shown herein, the pipeline is integrated with modules that gather data driven evidence to continuously improve the models.

A dialog is comprised of a series of communications between a user and a virtual agent. The dialog is comprised of or defined by a primary task, referred to herein as a dialog task, and one or more subtasks that support the primary task, also referred to herein as dialog subtasks. It is understood in the art that the virtual agent may be presented with questions from which answers are provided, and those answers are integrated into the flow of the dialog as dialog data. As shown and described herein a centralized knowledge representation that can be shared among the dialog subtasks. It covers domain entities, corresponding properties of the entities, and a set of relations of the entities. Examples of the corresponding properties include expected data types and acceptable values. The centralized knowledge representation (CKR) is constructed based on structured knowledge, typically accessible to end users, in the form of databases or application program interfaces (APIs). As shown in FIGS. 4-7, statements in the virtual communication platform are evaluated to extract key value pairs <k,v>, with k representing statement keywords, and v representing keyword value(s). In a commercial environment, the value may be a price or costs corresponding to the keywords. The values can be further processed to obtain keyword meta information, such as data types, scope of values, and if the value is informable or requestable. Such meta information may be stored as <k,r,v>, where k is the keyword or entity name, r denotes the relation or property type, and v denotes the value(s) of the keyword. The keyword as used herein is a term that represents relevant information, such as an entity. The meta information may be employed to determine implicit dialog states and dialog acts.

The demands for accessing existing commercial services through chat application, also known as conversational commerce, is increasing. It pertains to exchanging information with end users based on an underlying knowledge base of domain services, e.g. car insurance, real estate rental, etc. However, interacting with a knowledge base to fulfill tasks can become challenging with respect to fusing query rules with statistical components repetitively for each domain. As shown and described herein, a unified implicit dialog framework is provided for goal-oriented information seeking conversation systems. The framework enables the dialog interactions with domain data without relying on explicitly encoded rules, but utilizing an underlying data representation to build components required for the interactions. The framework facilitates domain agnostic prototyping of an interactive search of a domain, and enabling identification and sharing of common building blocks across various domains.

As shown and described herein, a domain knowledge base is available or can be obtained from a corresponding commercial web site having an embedded schema. A combination of the domain knowledge base, permitted queries to the knowledge base, and application logic is applied to infer dialog activities. As shown and described in FIGS. 1-7, the knowledge base is scanned and a central knowledge representation that can semantically ground multiple dialog tasks, such as intent labeling, state tracking, and issuing application program interface (API) calls to the domain database, is built. The central knowledge representation is automatically updated based on the central representation. It collects targeted feedback data that is directly consumed by the learning modules for continuous improvement of the conversational system(s).

Referring to FIG. 1, a block diagram (100) is provided to illustrate an embodiment of an architecture of a dialog framework. As shown, the framework includes several core modules, including a natural language understanding (NLU) module (110), an inference engine (120), a prompt generator (130), and a dialog environment simulator (140) for data collections. Input of these components, e.g. (110), (120), (130), and (140), are all initialized by the central knowledge representation (150). More specifically, the central knowledge representation is generated based on a domain knowledge base. It covers domain entities and a set of semantic relations between the entities. For example, with respect to apartment rental, the domain entity is "apartment" and the semantic relationship is "has-attribute". The centralized knowledge representation provides what is referred to as additional generic characteristics that are associated with the entities and which help identify content that might be applicable across domains. Examples of such generic characteristics include, but are not limited to, expected data types, ranges, and operations. The centralized knowledge representation is shown and described herein to be shared among dialog tasks and subtasks. It covers domain entities and corresponding properties of the entities, such as expected data types and acceptable values, and a set of relations of the entities.

As further shown herein, the dialog simulator (140) receives input from a user (160) and from an agent (162). The user input is in the form of natural language and text, which is communicated across a first channel (142) and a second channel (144), respectively, to the NLU module (110) to identify user intents. In one embodiment, the NLU module (110) leverages a natural language classifier to identify user intents from the receive input (160). The NLU module (110) provides an underlying representation of the user intent expressed as one or more relations between one or more entities parsed from the received input, e.g. statement. The NLU module (110) communicates the representation to the inference engine (120) across communication channel (122). The dialog simulator (140) identifies potential virtual locations, e.g. web sites, based on the subject matter of the received input and in one embodiment corresponding query, and extracts data from location embedded schema, which is communicated to the inference engine (120), to infer and output the next dialog action to a prompt generator (130), which is shown communicated to the dialog simulator (140) across a communication channel (132). In one embodiment, the dialog simulator collects user feedback during real-time interaction. Accordingly, the dialog framework access requests information based on identified user intent and converts that information to one or more dialog prompts for the dialog simulator (140).

Figure 2:
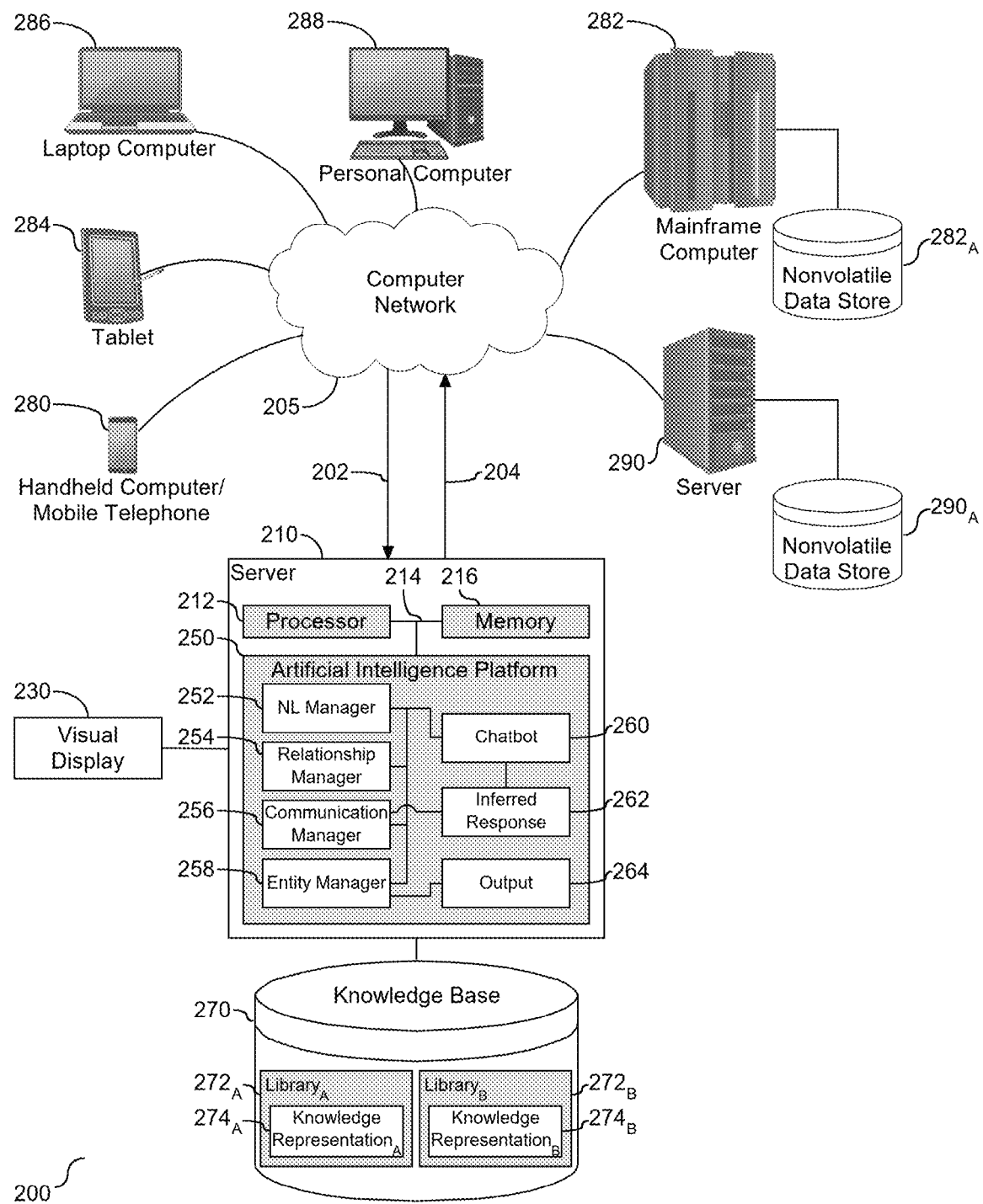
FIG. 2 depicts a schematic diagram of a computer system illustrating an embodiment of an artificial intelligence platform computing system in a network environment.

Referring to FIG. 2, a schematic diagram of a computer system (200) with an artificial intelligence platform to support functionality of a conversational agent over domain structured knowledge is depicted. As shown, a server (210) is provided in communication with a plurality of computing devices (280), (282), (284), (286), (288), and (290) across a network connection, e.g. computer network, (205). The server (210) is configured with a processing unit (212) in communication with memory (216) across a bus (214). The server (210) is shown with an artificial intelligence (AI) platform (250) with embedded tools to support and enable virtual conversational agent functionality processing and communication inference over the network (205) from one or more of the computing devices (280), (282), (284), (286), (288), and (290). The server (210) is shown herein operatively coupled to a knowledge base (270). Each of the computing devices (280), (282), (284), (286), (288), and (290) communicate with each other and with other devices or components via one or more wired and/or wireless data communication links, where each communication link may comprise one or more of wires, routers, switches, transmitters, receivers, or the like. In addition, each of the computing devices (280)-(290) is operatively coupled to the knowledge base (270) across the network (205). Other embodiments of the server (210) may be used with components, systems, sub-systems, and/or devices other than those that are depicted herein.

The AI platform (250) is shown herein configured with tools to manage and facilitate application of cognitive computing with respect to knowledge resources, and more specifically to support a unified framework for developing the conversational agent for goal-oriented information retrieving tasks over structured knowledge. As shown, the knowledge base (270) is operatively coupled to the AI platform (250) and is configured with a plurality of libraries of knowledge representations. Two libraries are shown herein as library$_A$ (272$_A$) and library$_B$ (272$_B$), with each library defined by a particular product or service domain. Each library is shown with a corresponding knowledge representation. More specifically, library$_A$ (272$_A$) is shown with knowledge representation$_A$ (274$_A$) and library$_B$ (272$_B$) is shown with knowledge representation$_B$ (274$_B$). In one embodiment, additional libraries with one or more knowledge representations may be provided, and as such, the quantity of libraries and knowledge representations should not be considered limiting. In one embodiment, the knowledge base may be configured with a single library, such as library$_A$ (272$_A$), with a plurality of knowledge representations, and each knowledge representation directed to a class or products or services. Accordingly, the quantity of libraries and knowledge representations shown herein is for descriptive purposes and should not be considered limiting.

The tools that comprise the AI platform (250) include, but are not limited to, a natural language (NL) manager (252), a relationship manager (254), a communication manager (256), and an entity manager (258) to manage and maintain knowledge resources and support inference functionality of the virtual conversation agent (260), e.g. chatbot or virtual dialog platform. As shown, the chatbot (260) is operatively coupled to the tools of the AI platform (250). The NL manager (252) functions to detect and analyze a NL statement received in the virtual dialog platform (260). The virtual dialog platform (260) provides a platform to receive and communicate data in a NL format. A user submits statements and queries in the platform (260), and receives responses from an underlying virtual agent in NL format via the platform (260). The NL manager (252) functions to analyze the received NL statement(s), which includes identification of one or more entities expressed in the statement. For example, in one embodiment, the analysis entails the NL manager (252) to identify grammatical components within the statement, e.g. subject, noun, verb, etc., and uses this identification to further parse the statement into one or more keywords. Accordingly, the NL manager (252) subjects the received statement(s) to NL processing to parse statement keywords.

The keywords are utilized by the relationship manager (254) to further process the NL statement. More specifically, the relationship manager (254) identifies an intent expressed in the statement subject to processing as a relationship between two or more of the identified and parsed keywords. In one embodiment, the relationship between any two statement keywords is represented in-part as one or more mathematical operations and one or more variables. As described in detail below, the statement, and more specifically, the statement components, is converted to a generic knowledge representation. As shown, the knowledge base is provided with different knowledge representations per domain, e.g. subject matter, product, service, etc. In one embodiment, each knowledge representation is referred to as a module. The relationship manager (254) functions to translate the keywords and any corresponding values to components of the knowledge representation. As shown and described in FIG. 5, a central knowledge representation (550) is shown with a plurality of components, also referred to herein as slots, and arranged in a structural relationship. In one embodiment, each component is represented as a graphical node with an edge between nodes representing a relationship between the nodes. The relationship manager (254) assigns each of the identified statement keywords to a designated component, e.g. slot, with the assignment based on alignment of the component relationship with the keyword relationship ascertained from the analysis of the statement.

The statement intent is ascertained from the identified statement keywords and any corresponding values. The communication manager (256) functions to express the statement intent based on the relationship between the keywords reflected in the knowledge representation, and to infer a response to the received statement. As shown herein, the inferred response (262) is communicated to the chatbot (260), e.g., virtual dialog platform.

There is a direct relationship between the statement keywords and the data populated in the knowledge structure. The NL manager (252) functions to analyze a relationship between the statement keywords and the data populated into the knowledge representation components. Different matching protocols may be utilized by the NL manager to conduct the analysis. The matching protocols include literal matching, fuzzy string matching, semantic similarity, or a combination of two or more of the matching protocols. Accordingly, the direct relationship is further defined by the matching protocol.

In addition to inferring a communication in the virtual dialog platform (260), the knowledge representation is presented to a knowledge base to identify appropriate or relevant response data. As show herein, the entity manager (258), which is operatively coupled to the communication manager (256), leverages the statement intent and keyword relationship as reflected in the knowledge representation, to identify relevant data from a corresponding knowledge base. In one embodiment, the knowledge base may be one or more virtual locations, e.g. web sites, with corresponding data. Using the populated knowledge representation, the entity manager (258) identifies one or more knowledge domain entities, e.g. websites, related to the statement intent and keyword relationship, identifies structured knowledge of the knowledge domain for each of the identified keywords, and creates an association between the identified structured knowledge and the populated knowledge representation. More specifically, the association leverages the functionality of the communication manager (256) to bridge the structured knowledge with the module components, e.g. slots, and associated component relationship(s), which in one embodiment, includes populating the module components with data from the entity structured knowledge of the domain entity. The entity manager (258) further communicates the identified structured knowledge as output (264) to the virtual dialog platform (260). Accordingly, the entity manager (258) functions to identify and communicate structured knowledge as response data to the received statement across the virtual dialog platform (260).

The various computing devices (280), (282), (284), (286), (288), and (290) in communication with the network (205) may include access points to the knowledge base (270) and the corresponding libraries, as well as access to the virtual dialog platform (260). The AI platform (250) functions to manage NLU with respect to statement representation, dialog inference, and structured knowledge identification and output.

The network (205) may include local network connections and remote connections in various embodiments, such that the AI platform (250) may operate in environments of any size, including local and global, e.g. the Internet. The AI platform (250) serves as a front-end system that can make available a variety of knowledge extracted from or represented in documents, network accessible sources and/or structured data sources. In this manner, some processes populate the AI platform (250), with the AI platform (250) also including input interfaces to receive requests and respond accordingly. Content users may access the AI platform (250) via a network connection or an internet connection to the network (205). The virtual dialog platform (260) is accessible by the operatively coupled visual display (230)

The AI platform (250) is shown herein with several tools to support and interface with the virtual dialog platform (260). The tools, including the NL manager (252), the relationship manager (254), the communication manager (256), and the entity manager (258), either individually or collectively function as either a software tool or a hardware tool.

In some illustrative embodiments, server (210) may be the IBM Watson® system available from International Business Machines Corporation of Armonk, N.Y., augmented with the mechanisms of the illustrative embodiments described hereafter. The IBM Watson® system may support the tools (252)-(258) to support knowledge resource management and virtual dialog functionality, including structured knowledge identification and inferring communication responses as described herein. The tools (252)-(258), also referred to herein as AI tools, are shown as being embodied in or integrated within the AI platform (250) of the server (210). The AI tools may be implemented in a separate computing system (e.g., 290) that is connected across network (205) to the server (210). Wherever embodied, the AI tools function to support and enable a virtual dialog platform with respect inferring communication dialogue and communication structured domain knowledge.

Types of information handling systems that can utilize the AI platform (250) range from small handheld devices, such as handheld computer/mobile telephone (280) to large mainframe systems, such as mainframe computer (282).

Examples of handheld computer (280) include personal digital assistants (PDAs), personal entertainment devices, such as MP4 players, portable televisions, and compact disc players. Other examples of information handling systems include pen, or tablet computer (284), laptop, or notebook computer (286), personal computer system (288), and server (290). As shown, the various information handling systems can be networked together using computer network (205). Types of computer network (205) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (290) utilizes nonvolatile data store ($290_A$), and mainframe computer (282) utilizes nonvolatile data store ($282_A$). The nonvolatile data store ($282_A$) can be a component that is external to the various information handling systems or can be internal to one of the information handling systems.

An information handling system employed to support the AI platform (250) may take many forms, some of which are shown in FIG. 2. For example, AI platform may take the form of a desktop, server, portable, laptop, notebook, or other form factor computer or data processing system. In addition, the information handling system to support the AI platform (250) may take other form factors such as a personal digital assistant (PDA), a gaming device, ATM machine, a portable telephone device, a communication device or other devices that include a processor and memory.

Figure 3:
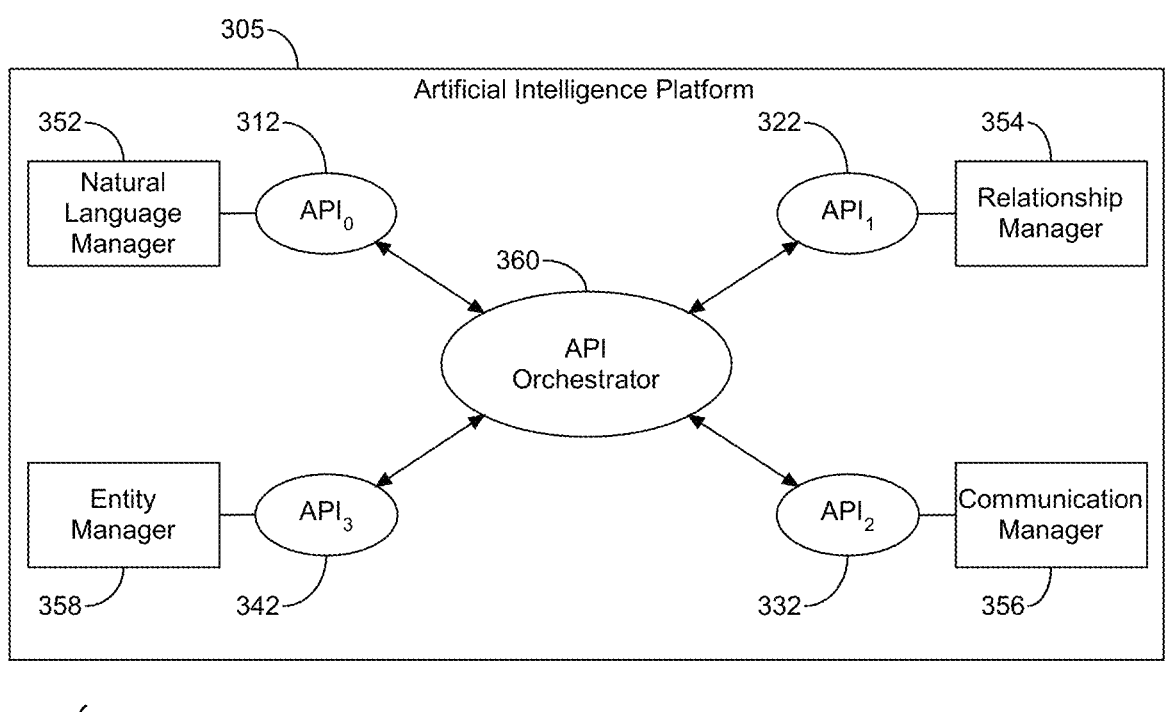
FIG. 3 depicts a block diagram illustrating an embodiment of the artificial intelligence platform tools, as shown and described in FIG. 2, and their associated application program interfaces.

An Application Program Interface (API) is understood in the art as a software intermediary between two or more applications. With respect to the AI platform (250) shown and described in FIG. 2, one or more APIs may be utilized to support one or more of the tools (252)-(258) and their associated functionality. Referring to FIG. 3, a block diagram (300) is provided illustrating the tools (352)-(358) and their associated APIs. As shown, a plurality of tools are embedded within the AI platform (305), with the tools including the NL manager (352) associated with $API_0$ (312), the relationship manager (354) associated with $API_2$ (322), the communication manager (356) associated with $API_2$ (332), and the entity manager (358) associated with $API_3$ (342). Each of the APIs may be implemented in one or more languages and interface specifications. $API_0$ (312) provides functional support for natural language processing, including statement keyword identification; $API_1$ (322) provides functional support to identify a knowledge representation corresponding to the processed statement, and to create a relationship between the statement keywords and keyword relationships and the knowledge representation; $API_2$ (332) provides functional support to infer a response within the virtual dialog platform to the received statement; and $API_3$ (342) provides functional support to identify and communicate structured knowledge to the virtual dialog platform as response data to the processed statement. As shown, each of the APIs (312), (322), (332), and (342) are operatively coupled to an API orchestrator (360), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 4:
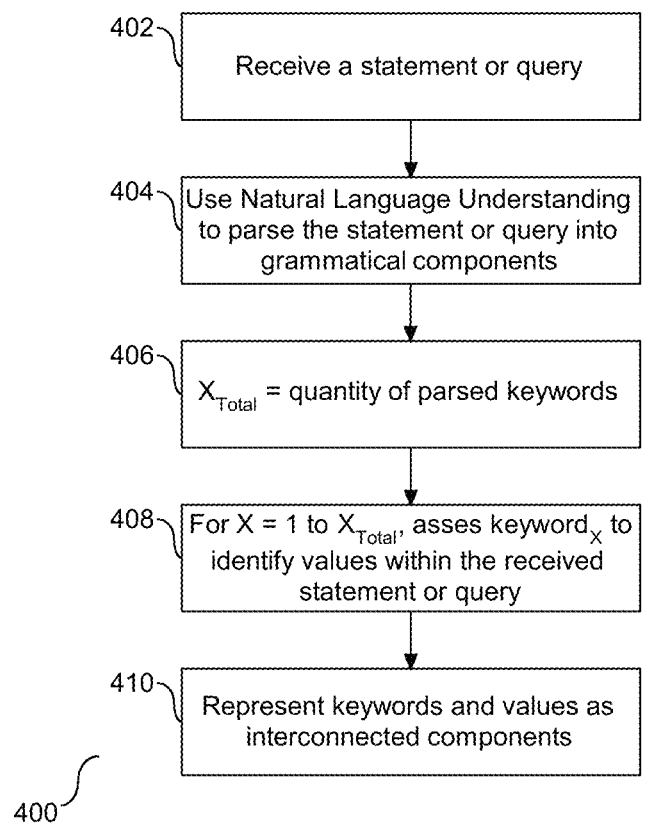
FIG. 4 depicts a flow chart illustrating an embodiment of a method of processing a natural language statement to determine statement intents and select or create a module structure in an information handling system to represent a structure of the statement.

Referring to FIG. 4, a flow chart (400) is provided illustrating a process to determine statement intents and select or create a module structure in an information handling system to represent a structure of the statement. As shown, a statement or a query is received or detected by a computer device (402). In one embodiment, the statement or query is identified in a corresponding virtual dialog platform. Natural language understanding (NLU) is utilized to parse the statement into grammatical components, which includes determining one or more entities in the received statement (404). In addition to or in place of parsing the grammatical component of the statement, the parsing at step (404) may entail identification of one or more keywords present in the statement. The quantity of parsed statement components, e.g. keywords, is assigned to the variable $X_{Total}$ (406). Each identified keyword, e.g. keyword$_X$, is subject to an assessment to identify any keywords values expressly or inherently present or detectable within the statement (408). In one embodiment, a NL processing tool is utilized to capture the statement keywords and identify the keyword value. The identified keyword(s) and value(s) are represented as interconnected components (410). Accordingly, the received statement is subject to processing to identify statement components, which is utilized to identify statement subject matter, keywords, and keyword values.

Figure 5:
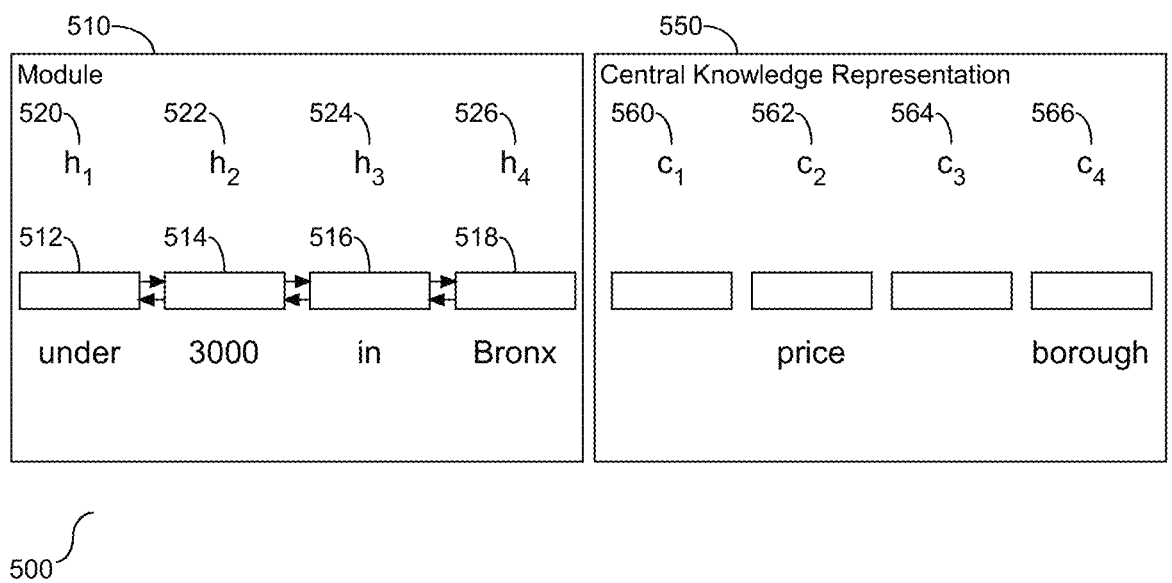
FIG. 5 depicts a block diagram illustrating an embodiment of an example representation of the statement based on the identified keywords and values.

Referring to FIG. 5, a block diagram (500) is provided to illustrate an example representation of the statement based on the identified keywords and values. As shown, the module (510) is comprised of a plurality of interconnected components, (512), (514), (516), and (518). The module (510) represents a query or statement received by the dialog simulator (140). Keywords and a value are shown populated in the components. In this example, the keyword 'under' is assigned to the first component, $h_1$, (520). The value is assigned to the second component, $h_2$ (522). The second keyword 'in' is assigned to the third component, $h_3$. The third keyword 'Bronx' is assigned to the fourth component, $h_4$, (526). In this example, the keyword, e.g., entity, is "Bronx" and the value is "3,000", with the key-value pair represented as <Bronx, 3000>. The values $h_1$, $h_2$, $h_3$, and $h_4$ are a latent representation of detected words from the NLU platform represented in vector form.

Figure 6:
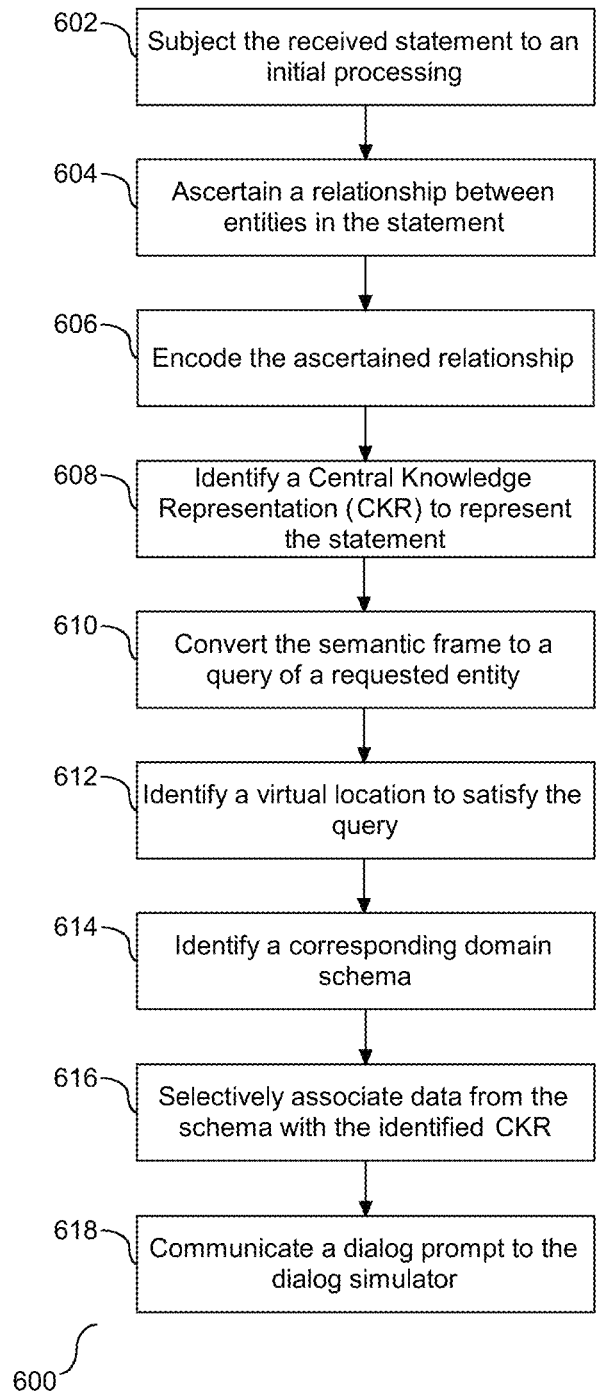
FIG. 6 depicts a flow chart illustrating an embodiment of a method of processing the NL statement or query and mapping the statement to a dialog module.

The centralized knowledge representation (CKR) is employed to represent the received statement or query in a format that can be shared among dialog subtasks. The CKR covers the domain entities, corresponding properties, such as expected data types and acceptable values, or the entities, and a set of relations of the entities. The CKR is constructed based on structured knowledge typically accessible to end users in the form of databases or application APIs. Referring to FIG. 6, a flow chart (600) is provided to illustrate an embodiment of a method of processing the NL statement or query and mapping the statement to a dialog module. As shown in FIG. 6, the received or detected user statement is subject to an initial processing to identifying keywords and values present in the statement (602). Data from the processed user statement is subject to representation in a corresponding module of the CKR based on statement intent. Following step (602), the statement intent is ascertained as a relationship between two or more entities represented in the statement (604) and encoded (606). In one embodiment, the relationship between the two or more entities is represented in-part as one or more mathematical operations and one or more variables. Instead of having a descriptive label of intent in the CKR, the intent is represented as a composition of entities and operations. For example, with respect to finding an apartment, the intent of "increase price range" is represented as <"apartment", (price, +, num_val)>. Thus, the intent can be directly inferred from the CKR and potentially adaptable for a new domain since it is composed based on relatively generation operations. In one embodiment, the framework of the CKR is designed to support a plug-and-play of customized modules. The encoded intent together with the statement subject matter is utilized to identify a CKR to generically represent the statement (608). Referring to FIG. 5, the CKR is shown at (550), with a plurality of slots shown herein as $c_1$ (560), $c_2$ (562), $c_3$ (564), and $c_4$ (566). The CKR and corresponding slots are a latent representation of the input statement. As shown in this example, the value 'price' at $c_2$ (562) is a latent representation of the value(s) at $h_2$ (522), and the value 'borough' at $c_4$ (566) is a latent representation of the value(s) at $h_4$ (526).

In one embodiment, a library of generic CKR representations is maintained and searched to identify a previous generic representation, also referred to herein as a warm start. If a previous representation does not exist, then a new representation may be created, also referred to as a cold start. Accordingly, the received statement is subject to initial processing and component parsing to identify and represent statement components.

For a cold start without annotated dialog data, user intent is encoded with semantically matched entities and corresponding generic operational acts on the entities, such as ADD and DELETE, as constrained by an expected data type. Semantic matching maps user utterances to elements in the CKR in three consecutive steps of lateral matching, fuzzy matching, which identifies approximate matches between entities, and vector representation matching, which supports matching related entities using vectorized word representations. For a warm state with some dialog data annotated with intent, a training model is employed to predict intents. More specifically, a sequence of input text is encoded by a neural network, e.g. LSTM or GRU, at each time step in the sequence. Following step (608), the intent and input statement representation forms a semantic frame, which is converted to a query or API call with keywords and value(s) as search constraints of a requested entity (610). The query or API call is processed, and a domain, e.g. virtual location or website, to satisfy the query or API calls is identified (612). A corresponding domain schema is identified (614) and data from the schema is selectively associated with the identified CKR (616). More specifically, the latent representation in the CKR is matched with the schema representation and values to create an association between the location structured knowledge and the latent representation of the statement, and to populate one or more components in the latent representation from the entity structured knowledge.

Figure 7:
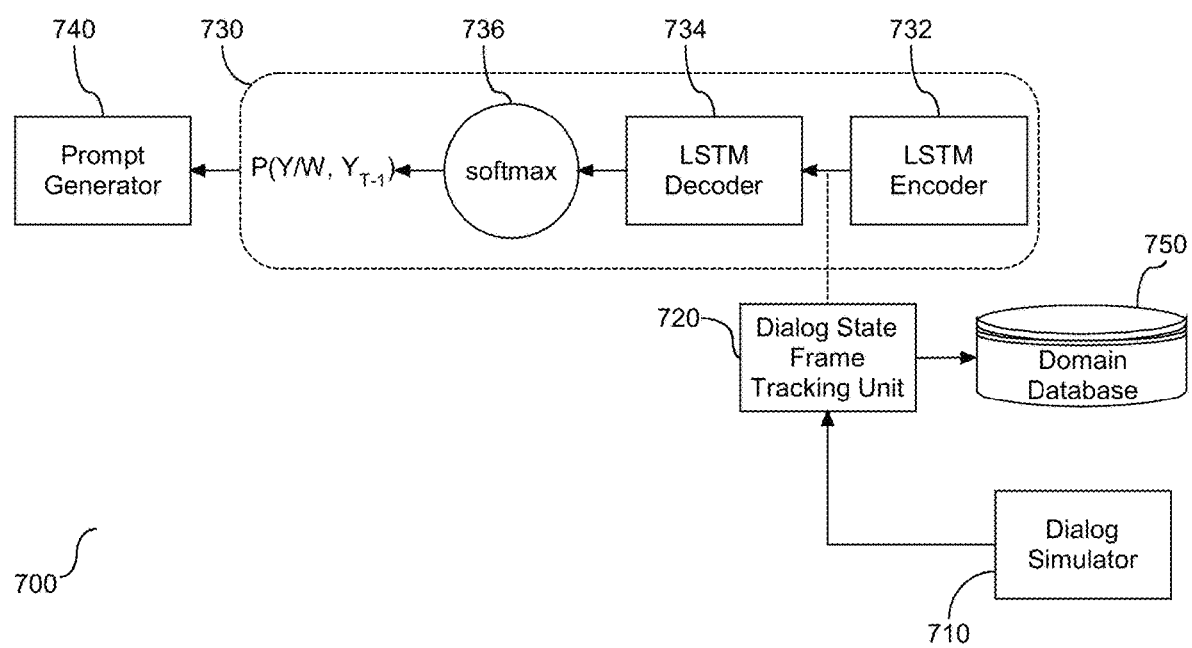
FIG. 7 depicts a flow diagram illustrating an embodiment of components and logic flow to generate a dialog prompt.

Following step (616), the next dialog activity, e.g. dialog prompt, is inferred and communicated to the dialog simulator as a dialog prompt (618). As shown in FIG. 1, this inference is supported by the inference engine (120). The goal of the inference engine is to optimize obtaining results for the received statement or query, and to infer the next action. Based on the example in FIG. 5, and the output from the location schema, the inference engine may request location specification or price range identification. Referring to FIG. 7, a flow diagram (700) is provided to illustrate an embodiment of components and logic flow to generate a dialog prompt. As shown, the dialog simulator (710) is operatively coupled to a dialog state, e.g. dialog activity, frame tracking unit (720). A dialog statement is detected and processed, as shown and described in FIG. 5, and a domain database (750) represented as a schema is utilized to populate components of the CKR. As shown herein, a recurrent neural network (730) is shown with long short-term memory (LSTM) blocks (732) and (734) to provide context to the received statement and to create output in the form of a dialog prompt generator (740). The recurrent neural network uses the LSTM block (732) to encode the received statement to the latent representation, and uses the LSTM block (734) to decode the statement into dialog states. A softmax activation function is leveraged (736) to assess and output the probability, P, of each dialog action, where y represents the dialog state, t−1 represents a previous dialog statement, and w is a weight. Accordingly, the LSTM blocks shown herein utilizes the statement input and latent representation of the input to create and communication output to the dialog simulator.

The inference of the dialog prompt at step (618) is based on the statement intent, the dialog statement, and in one embodiment previous search results. The dialog simulator either issues an API call based on the CKR or requests most information to optimize the search experience. Accordingly, the CKR provides a unified framework for developing the conversational agent for goal-oriented information retrieving tasks over structured knowledge.

Aspects of the functional tools (252)-(258) and their associated functionality may be embodied in a computer system/server in a single location, or in one embodiment, may be configured in a cloud based system sharing computing resources. With references to FIG. 8, a block diagram (800) is provided illustrating an example of a computer system/server (802), hereinafter referred to as a host (802) in communication with a cloud based support system (880), to implement the processes described above with respect to FIGS. 1-7. Host (802) is operational with numerous other general purpose or special purpose computing system environments or configurations. Examples of well-known computing systems, environments, and/or configurations that may be suitable for use with host (802) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (802) may be described in the general context of computer system-executable instructions, such as program modules, being executed by a computer system. Generally, program modules may include routines, programs, objects, components, logic, data structures, and so on that perform particular tasks or implement particular abstract data types. Host (802) may be practiced in distributed cloud computing environments (880) where tasks are performed by remote processing devices that are linked through a communications network. In a distributed cloud computing environment, program modules may be located in both local and remote computer system storage media including memory storage devices.

Figure 8:
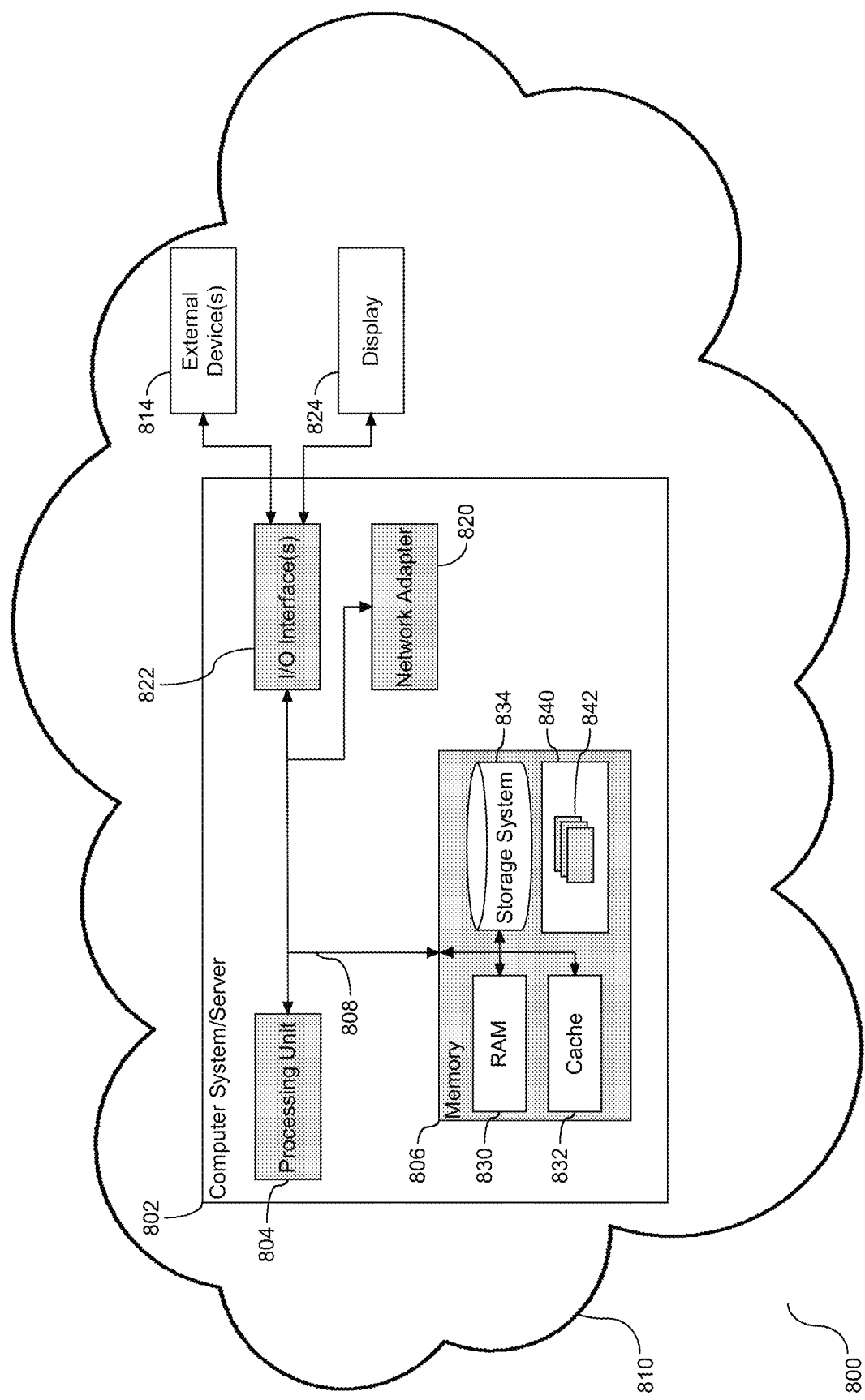
FIG. 8 depicts a block diagram illustrating an example of a computer system/server of a cloud based support system, to implement the system and processes described above with respect to FIGS. 1-7.

As shown in FIG. 8, host (802) is shown in the form of a general-purpose computing device. The components of host (802) may include, but are not limited to, one or more processors or processing units (804), e.g. hardware processors, a system memory (806), and a bus (808) that couples various system components including system memory (806) to processor (804). Bus (808) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (802) typically includes a variety of computer system readable media. Such media may be any available media that is accessible by host (802) and it includes both volatile and non-volatile media, removable and non-removable media.

Memory (806) can include computer system readable media in the form of volatile memory, such as random access memory (RAM) (830) and/or cache memory (832). By way of example only, storage system (834) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (808) by one or more data media interfaces.

Program/utility (840), having a set (at least one) of program modules (842), may be stored in memory (806) by way of example, and not limitation, as well as an operating system, one or more application programs, other program modules, and program data. Each of the operating systems, one or more application programs, other program modules, and program data or some combination thereof, may include an implementation of a networking environment. Program modules (842) generally carry out the functions and/or methodologies of embodiments to dynamically communication evaluation interrogatory identification and processing. For example, the set of program modules (842) may include the tools (252)-(258) as described in FIG. 2.

Host (802) may also communicate with one or more external devices (814), such as a keyboard, a pointing device, etc.; a display (824); one or more devices that enable a user to interact with host (802); and/or any devices (e.g., network card, modem, etc.) that enable host (802) to communicate with one or more other computing devices. Such communication can occur via Input/Output (I/O) interface(s) (822). Still yet, host (802) can communicate with one or more networks such as a local area network (LAN), a general wide area network (WAN), and/or a public network (e.g., the Internet) via network adapter (820). As depicted, network adapter (820) communicates with the other components of host (802) via bus (808). In one embodiment, a plurality of nodes of a distributed file system (not shown) is in communication with the host (802) via the I/O interface (822) or via the network adapter (820). It should be understood that although not shown, other hardware and/or software components could be used in conjunction with host (802). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (806), including RAM (830), cache (832), and storage system (834), such as a removable storage drive and a hard disk installed in a hard disk drive.

Computer programs (also called computer control logic) are stored in memory (806). Computer programs may also be received via a communication interface, such as network adapter (820). Such computer programs, when run, enable the computer system to perform the features of the present embodiments as discussed herein. In particular, the computer programs, when run, enable the processing unit (804) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In one embodiment, host (802) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 9:
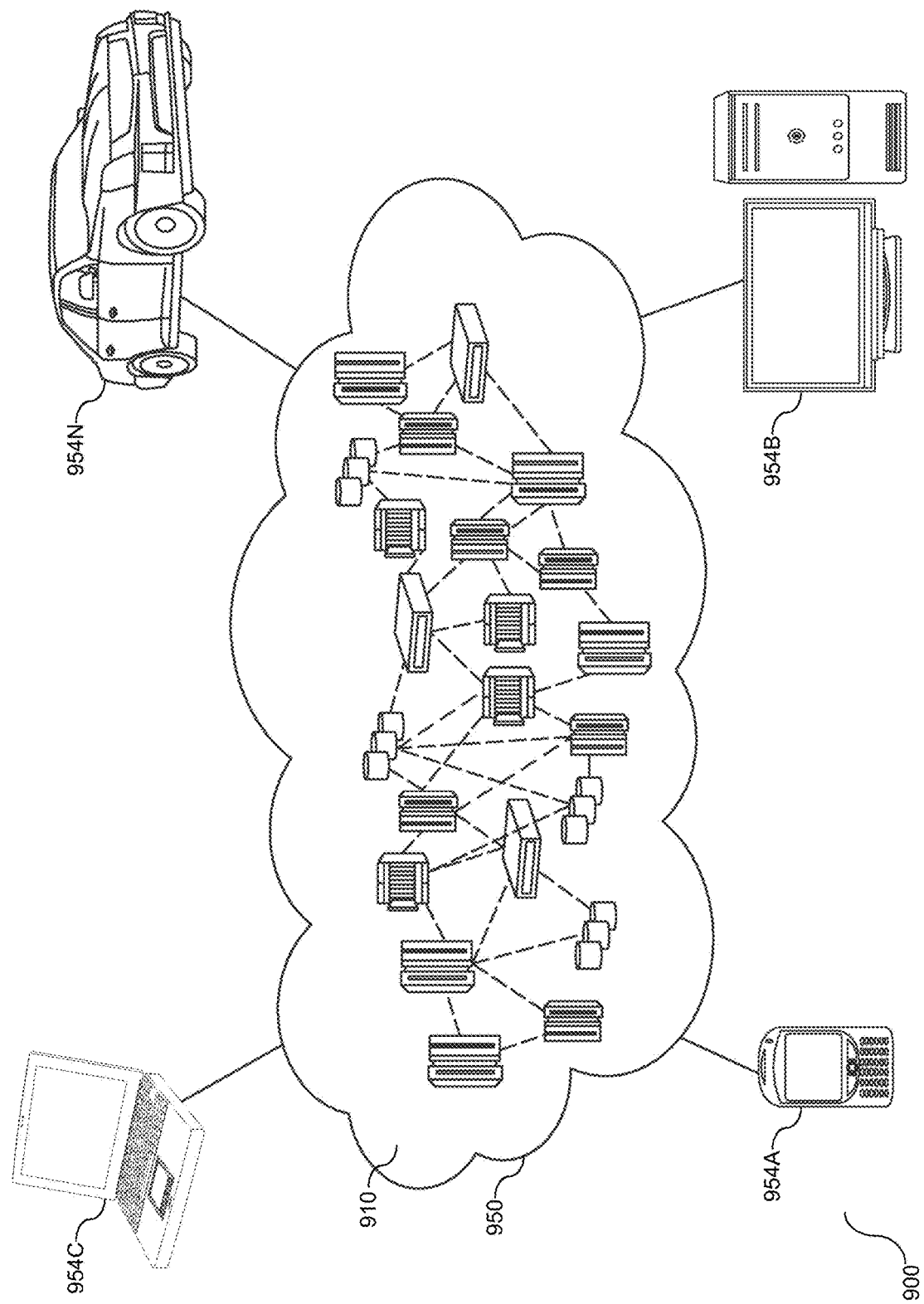
FIG. 9 depicts a block diagram illustrating a cloud computer environment.

Referring now to FIG. 9, an illustrative cloud computing network (900). As shown, cloud computing network (900) includes a cloud computing environment (950) having one or more cloud computing nodes (910) with which local computing devices used by cloud consumers may communicate. Examples of these local computing devices include, but are not limited to, personal digital assistant (PDA) or cellular telephone (954A), desktop computer (954B), laptop computer (954C), and/or automobile computer system (954N). Individual nodes within nodes (910) may further communicate with one another. They may be grouped (not shown) physically or virtually, in one or more networks, such as Private, Community, Public, or Hybrid clouds as described hereinabove, or a combination thereof. This allows cloud computing environment (900) to offer infrastructure, platforms and/or software as services for which a cloud consumer does not need to maintain resources on a local computing device. It is understood that the types of computing devices (954A-N) shown in FIG. 9 are intended to be illustrative only and that the cloud computing environment (950) can communicate with any type of computerized device over any type of network and/or network addressable connection (e.g., using a web browser).

Figure 10:
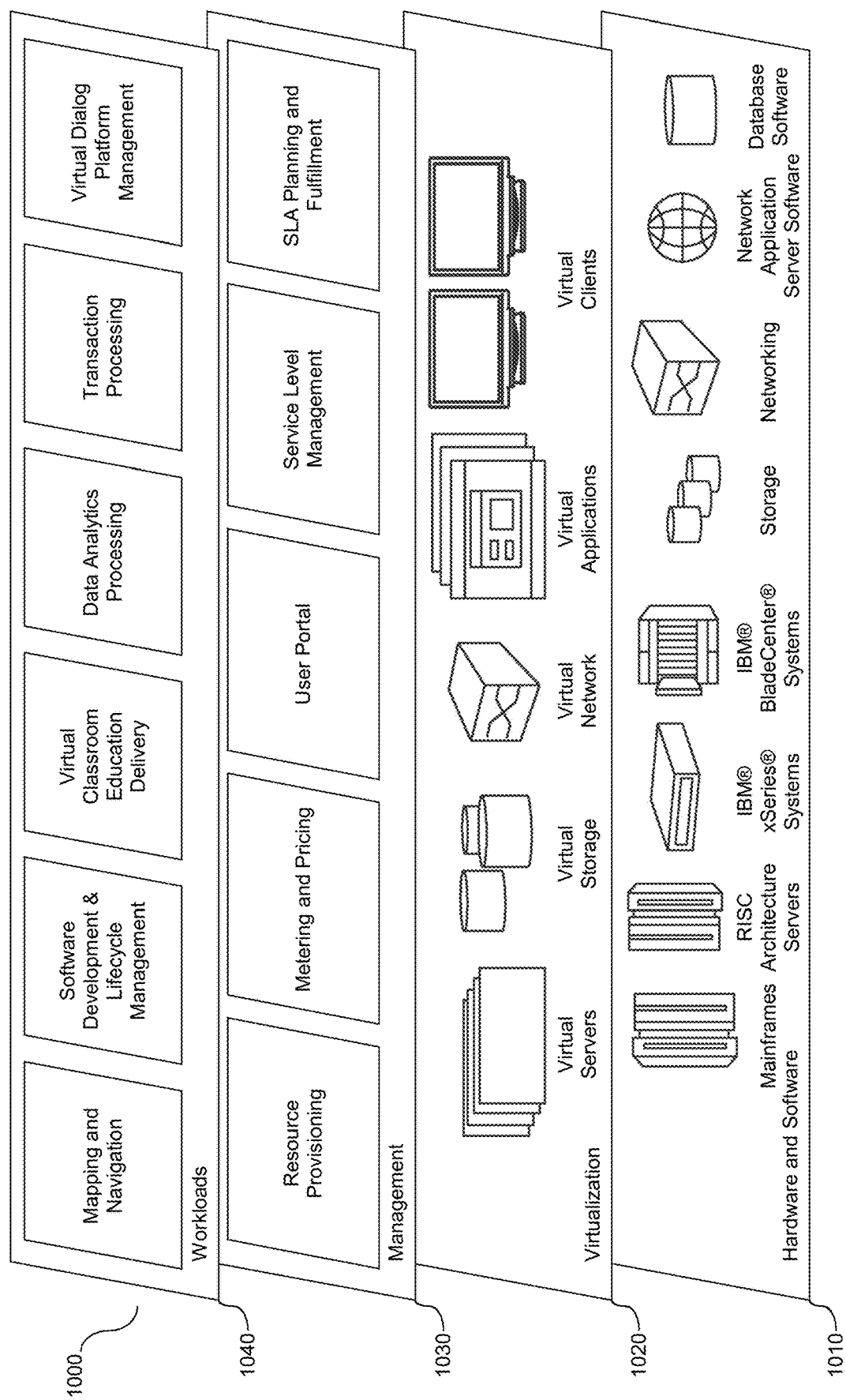
FIG. 10 depicts a block diagram illustrating a set of functional abstraction model layers provided by the cloud computing environment.

Referring now to FIG. 10, a set of functional abstraction layers (1000) provided by the cloud computing network of FIG. 9 is shown. It should be understood in advance that the components, layers, and functions shown in FIG. 10 are intended to be illustrative only, and the embodiments are not limited thereto. As depicted, the following layers and corresponding functions are provided: hardware and software layer (1010), virtualization layer (1020), management layer (1030), and workload layer (1040).

The hardware and software layer (1010) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1020) provides an abstraction layer from which the following examples of virtual entities may be provided: virtual servers; virtual storage; virtual networks, including virtual private networks; virtual applications and operating systems; and virtual clients.

In one example, management layer (1030) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (1040) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and virtual dialog platform management.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to model NL statements, leverage structured data corresponding to the modeled statement, and infer virtual communication response data in a corresponding virtual communication platform.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
   a processor operatively coupled to memory; and
   an artificial intelligence (AI) platform, in communication with the processor, having natural language understanding (NLU) tools configured to represent an intent within a virtual dialog platform operatively coupled to the AI platform, the tools comprising:
   a natural language (NL) manager configured to detect and analyze a NL statement, including to identify one or more entities expressed in the NL statement and to leverage the identified one or more entities to parse the NL statement into two or more keywords and one or more keyword values;
   a relationship manager, operatively coupled to the NL manager, the relationship manager configured to represent intent of the NL statement as a keyword relationship between the two or more keywords identified in the NL statement, including to:
   identify a knowledge representation to represent the NL statement as a formatted module comprising a structure comprising two or more components and a component relationship, the two or more components representing generic characteristics;
   assign the two or more keywords and the one or more keyword values to the two or more components of the formatted module based on an alignment of the component relationship with the keyword relationship;
   a communication manager configured to:
   express the intent of the statement based on the relationship between the two or more keywords; and
   selectively associate a domain schema with the represented NL statement in the formatted module, and infer a response from the domain schema to the received statement; and
an entity manager configured to communicate the inferred response to the virtual dialog platform operatively coupled to the AI platform.

2. The system of claim 1, wherein the relationship between the two or more keywords is represented in part as one or more mathematical operations and one or more variables.

3. The system of claim 1, wherein the entity manager is operatively coupled to the communication manager, the entity manager configured to:
identify one or more entities related to the intent of the NL statement and the relationship between the two or more keywords and the one or more keyword values;
identify structured knowledge for each of the identified two or more keywords and one or more keyword values;
create an association between the identified structured knowledge and the formatted module; and
communicate the identified structured knowledge as output to the virtual dialog platform.

4. The system of claim 3, wherein the created association between the identified structured knowledge and the formatted module, further comprises the communication manager configured to bridge the identified structured knowledge with the module components and component relationship, including populate one or more module components with data from the identified structured knowledge.

5. The system of claim 1, wherein the statement parse by the NL manager includes the NL manager configured to selectively analyze a relationship between the two or more keywords expressed in the statement and the data populated in the one or more module components.

6. The system of claim 5, wherein the NL manager is further configured to selectively analyze the relationship, including to leverage a matching protocol comprising literal matching, fuzzy string matching, semantic similarity analysis, or a combination thereof.

7. A computer program product to represent an intent within a virtual dialog platform, the computer program product comprising:
a computer readable storage medium having program code embodied therewith, the program code executable by a processor to:
detect and analyze a NL statement, including to identify one or more entities expressed in the NL statement and to leverage the identified one or more entities to parse the NL statement into two or more keywords and one or more keyword values;
represent intent of the received NL statement as a keyword relationship between the two or more keywords identified in the NL statement, including identify a knowledge representation to represent the NL statement as a formatted module comprising a structure comprising two or more components and a component relationship, the two or more components representing generic characteristics, and assign the two or more keywords and the one or more keyword values to the two or more components of the formatted module based on an alignment of the component relationship with the keyword relationship; and
express the intent of the statement based on the relationship between the two or more keywords;
selectively associate a domain schema with the represented NL statement in the formatted modules, and infer a response from the domain schema to the received statement; and
communicate the inferred response to the virtual dialog platform.

8. The computer program product of claim 7, wherein the relationship between the two or more keywords is represented in part as one or more mathematical operations and one or more variables.

9. The computer program product of claim 7, further comprising program code executable by the processor to:
identify one or more entities related to the intent of the NL statement and the relationship between the two or more keywords and one or more keyword values;
identify structured knowledge for each of the identified two or more keywords and the one or more keyword values;
create an association between the identified structured knowledge and the formatted module; and
communicate the identified structured knowledge as output to the virtual dialog platform.

10. The computer program product of claim 9, wherein the created association between the identified structured knowledge and the formatted module, further comprises program code executable by the processor to bridge the identified structured knowledge with the module components and component relationship, including populate one or more module components with data from the identified structured knowledge.

11. The computer program product of claim 7, wherein the program code to parse the statement includes program code executable by the processor to selectively analyze a relationship between the two or more keywords expressed in the statement and the data populated in the one or more module components.

12. The computer program product of claim 11, wherein the program code to selectively analyze the relationship comprises program code executable by the processor to leverage a matching protocol, the matching protocol comprising literal matching, fuzzy string matching, semantic similarity analysis, or a combination thereof.

13. A method of using a computing device to represent intents within a virtual dialog platform, the method comprising:
detecting and analyzing, by the computing device, a NL statement, including to identify one or more entities expressed in the NL statement and to leverage the identified one or more entities to parse the NL statement into two or more keywords and one or more keyword values;
representing intent of the NL statement as a keyword relationship between the two or more keywords identified in the NL statement, by the computing device, including identifying a knowledge representation to represent the NL statement as a formatted module comprising a structure comprising two or more components and a component relationship, the two or more components representing generic characteristics, and assigning the two or more keywords and the one or more keyword values to the two or more components of the formatted module based on an alignment of the component relationship with the keyword relationship;
expressing, by the computing device, the intent of the statement based on the relationship between the two or more keywords;

selectively associating a domain schema with the represented NL statement in the formatted modules, and inferring a response from the domain schema to the received statement; and communicating the inferred response to the virtual dialog platform.

14. The method of claim 13, wherein the relationship between the two or more keywords is represented in part as one or more mathematical operations and one or more variables.

15. The method of claim 13, further comprising:

identifying one or more entities related to the intent of the NL statement and the relationship between the two or more keywords and the one or more keyword values;

identifying structured knowledge for each of the identified two or more keywords and the one or more keyword values;

creating an association between the identified structured knowledge and the formatted module; and communicating the identified structured knowledge as output to the virtual dialog platform.

16. The method of claim 15 wherein the creating of the association between the identified structured knowledge and the formatted module further comprises bridging the identified structured knowledge with the module components and component relationship, including populating one or more module components with data from the identified structured knowledge.

17. The method of claim 13, wherein the statement parsing includes selectively analyzing a relationship between the two or more keywords expressed in the statement and the data populated in the one or more module components.

18. The method of claim 17, wherein selectively analyzing the relationship leverages a matching protocol, the matching protocol comprising literal matching, fuzzy string matching, semantic similarity analysis, or a combination thereof.

19. The method of claim 13, further comprising processing the one or more keyword values to obtain keyword meta information, the meta information comprising data type and scope of value.

20. The method of claim 19, further comprising employing the meta information to determine a dialog characteristic, including a dialog state and a dialog act.

* * * * *